United States Patent [19]

d'Alayer de Costemore d'Arc

[11] Patent Number: 4,635,156
[45] Date of Patent: Jan. 6, 1987

[54] CLEANING CASSETTE FOR MAGNETIC TAPE APPARATUS

[75] Inventor: Stéphane d'Alayer de Costemore d'Arc, Brussels, Belgium

[73] Assignee: Staar, S.A., Brussels, Belgium

[21] Appl. No.: 526,122

[22] Filed: Aug. 24, 1983

[30] Foreign Application Priority Data

Sep. 13, 1982 [BE] Belgium .................................. 209004
Sep. 13, 1982 [BE] Belgium .................................. 209006

[51] Int. Cl.⁴ .......................... G11B 5/41; A47K 7/02
[52] U.S. Cl. .................................. 360/132; 360/137;
   15/210 R; 15/104.93; 15/DIG. 12; 15/DIG. 13
[58] Field of Search ............... 360/132, 137, 128;
   15/210 R, 12 D

[56] References Cited

U.S. PATENT DOCUMENTS

| | | | |
|---|---|---|---|
| 3,783,470 | 1/1974 | Myers et al. ........................ | 15/210 R |
| 3,955,214 | 5/1976 | Post et al. ........................... | 15/210 R |
| 4,324,014 | 4/1982 | Stutz, Jr. et al. .................. | 360/137 |
| 4,377,831 | 3/1983 | Davis et al. ........................ | 360/128 |
| 4,388,663 | 6/1983 | Becella .............................. | 360/128 |
| 4,470,089 | 9/1984 | Hutchins et al. .................... | 360/137 |
| 4,498,113 | 2/1985 | Clausen et al. ..................... | 360/128 |

FOREIGN PATENT DOCUMENTS 2158994 11/1971 Fed. Rep. of Germany .

Primary Examiner—Raymond F. Cardillo
Assistant Examiner—Alyssa H. Bowler
Attorney, Agent, or Firm—Leydig, Voit & Mayer, Ltd.

[57] ABSTRACT

A cassette of cleaning tape for cleaning the driving, play-back and recording components of a magnetic tape apparatus. The cleaning cassette has a tape and a roller rotatably supported in the cassette housing having a core of absorbent material adapted to be impregnated with cleaning liquid, and absorbent material exposed on a portion of the surface of the roller for applying liquid to wet a surface of the tape intermittently as the tape is moved in the cassette, the intermittent liquid application preventing the tape from sticking to components as the tape is driven through the magnetic tape apparatus being cleaned.

7 Claims, 5 Drawing Figures

CLEANING CASSETTE FOR MAGNETIC TAPE APPARATUS

TECHNICAL FIELD

The present invention relates to cleaning devices for cleaning the components of magnetic tape recording and/or play-back apparatus.

BACKGROUND ART

It is well known that the passage of magnetic tapes against components such as recording and play-back heads and driving members creates deposits of particles of iron oxide, and that the accumulation of these deposits gives rise to noise and/or to distortion of the recorded or reproduced signal. Also such deposits impair the passage of the tape at the constant speed required for the recording or reproduction of signals of good quality because of slipping of the driving members.

To eliminate these deposits and to clean such components of the recording and/or play-back apparatus, various means have been proposed including cleaning cassettes. One type of cleaning cassette incorporates a fixed tank of cleaning liquid which is applied to a tape then used to apply the cleaning liquid on the tape to the components to be cleaned. However, the use of such cassettes requires attention from the user, and the cleaning liquid while applied continuously to the tape, may not be uniformly distributed thereon which reduces cleaning effectiveness.

To ensure that effective cleaning is achieved, various stages listed below must be scrupulously observed:

rewinding of a tape before the cassette is inserted, to obtain a maximum cleaning period;

inserting the cassette and switching the apparatus to drive the cleaning tape at the normal tape speed to ensure cleaning;

stopping the drive of the tape at the end of the tap to avoid abnormal pulling forces.

If, for example, the cleaning tape is not rewound completely before starting the cleaning operation, or the operation is switched to fast speed with the cleaning cassette in place, there is a substantial risk of damaging either the cleaning tape or components of the apparatus. Furthermore, within one and the same family of apparatus it is common to find models having different modes of operation, which the user may be unfamiliar with; it will be appreciated that there are many sources of handling errors.

DISCLOSURE OF THE INVENTION

Moreover, the permanent and continuous application of any cleaning liquid on the tape, which is necessary to ensure effective cleaning, tends to make the tape adhesive, to the extent that it sticks to and winds itself around the rotary elements (capstan, pressure rollers, the drum of video heads). The result of this is, generally, that either the cleaning tape or components of the apparatus are damaged.

This phenomenon is especially a problem in video cassette recorders in which the play-back and recording heads are mounted on drums having a diameter of 70 to 100 mm and rotating at speeds of the order of 1,500 to 1,800 revolutions per minute. When a tape wetted with liquid is carried against the drum of such VCRs, and sticks to the drum, it is immediately driven at the peripheral speed of the drum, and it will be appreciated that, as a function of the figures mentioned above, the tape will be unwound completely from the reel hubs of the cassette and wrapped around the drum within a few tenths of a second. The major disadvantages of this are that:

the tape is unwound from the reel hubs of the cassette at high speed whereas it is normally unwound only at a very low speed (a few centimeters per second) which presents a high risk of damage to the tape or components of the apparatus;

no cleaning has been carried out;

since the tape is wrapped around the drum in the apparatus, it is impossible to rewind it in the cassette, and the apparatus has to be taken to a repair shop for removal of the tape.

The main object of the present invention is to solve the problems mentioned above by providing a cleaning cassette which applies cleaning liquid to the components of the apparatus without sticking to such components as the drum of a VCR or capstans.

BRIEF DESCRIPTION OF THE DRAWINGS

Further objects will appear from the following descriptions, taken in conjunction with the accompanying drawings, in which:

Turning now to FIG. 1, a cleaning cassette 10 is shown having a cleaning tape 11 connected to a pair of reel hubs 12, 13 rotatably mounted in the cassette housing 14. When the reel hubs are driven in the direction of the arrow, the tape will be unwound from the take-off reel hub 12 and transferred to the take-up reel hub 13. The cleaning tape is preferably made of uncoated polyethylene film, and is trained around rods or rollers 18 so as to extend across the front edge of the cassette housing 14, where it is protected by a removable cover 19.

Figure 2:
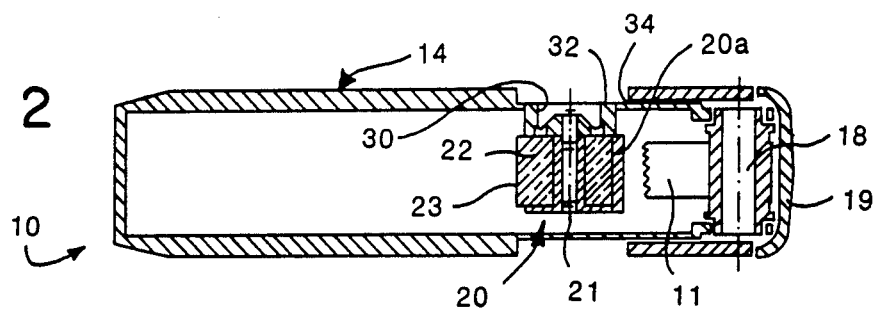
FIG. 2 is a sectional view taken in the planes of lines 2—2 in FIG. 1.

According to the invention, the cassette includes a source of cleaning liquid herein shown as a roller 20 rotatable on a shaft 21 and having a core 22 of absorbment material such as felt or sponge rubber. In order to provide cleaning liquid for applying to the tape, the core 22 of absorbent material may be saturated with cleaning liquid. To apply the cleaning liquid from the saturated core 22, a segment 23 of the core 22 is exposed on and protrudes from, the periphery of the roller 20, except for this segment 23 the core 22 being enclosed in an impervious shell 20a.

To permit the introduction of cleaning liquid to the core 22, the cassette housing has an opening 30 formed by a disc shaped element 32 fixed to the outer wall 34 of the housing 14. To spread the cleaning liquid through the core 22, the device 36 is used providing a ring of spaced holes 36a through which liquid passes to the core 22.

As the tape is driven from reel hub to reel hub, the roller 20 is driven and during each rotation of the roller, applies liquid from the core to the outer surface of the tape over a sector corresponding to the surface of the protruding segment 23 of the core. The surface of the tape 11 is wet intermittently in order to avoid sticking of the tape to the drum carrying magnetic heads, or to tape driving means, of the tape apparatus being cleaned with the cleaning cassette.

In an exemplary embodiment, the tape is wetted every six centimeters for a length of approximately eight millimeters, but this may be varied as desired by providing a wider or narrower segment 24 through which the core 22 protrudes.

In order to provide a reversible cassette, a duplicate roller $20^1$ similar to the first roller 20 is provided on the other end of the cassette to engage the tape 11 near the other reel hub 13. When the tape is driven in the direction from the reel hub 13 to the reel hub 12, the duplicate roller $20^1$ serves to apply liquid to the surface of the tape 11 intermittently, for cleaning components of magnetic tape apparatus.

Figure 1:
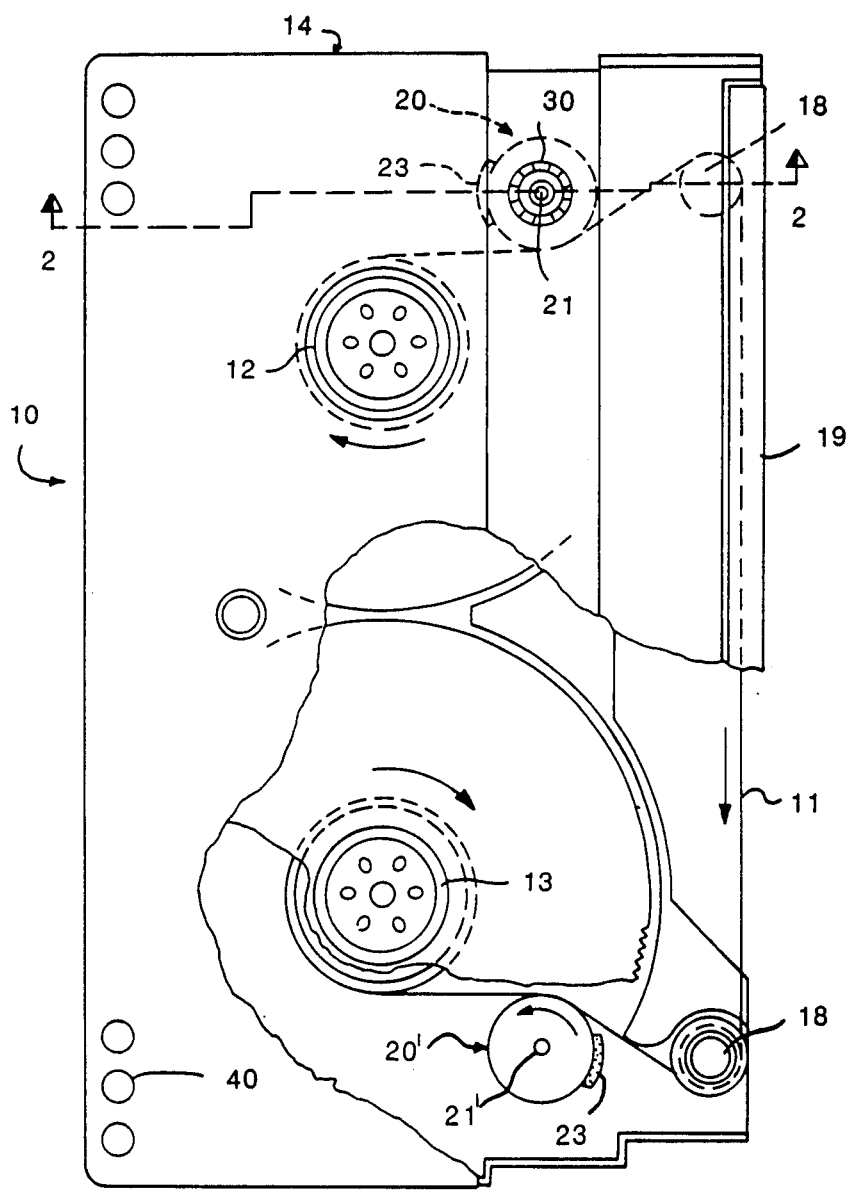
FIG. 1 is a plan view of a cassette constructed in accordance with the invention.
Figure 3:
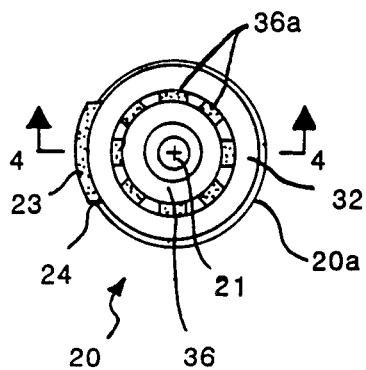
FIG. 3 is an enlarged view of the cleaning reel.
Figure 4:
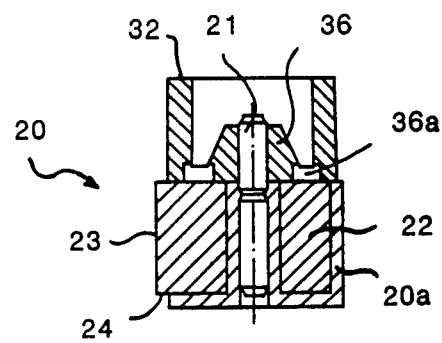
FIG. 4 is a sectional view taken in the plane of lines 4—4 in FIG. 3.
Figure 5:
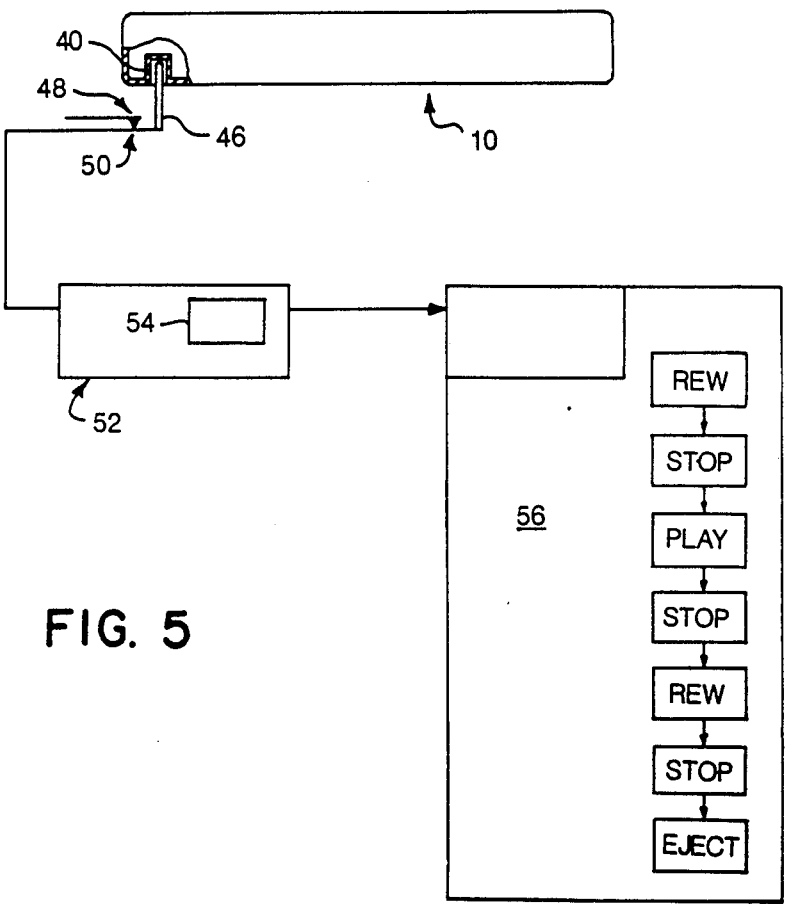
FIG. 5 is a diagrammatic view of the cassette and controller of the apparatus, and elements for detecting the cassette as it is inserted into the apparatus.

Referring now to FIGS. 1 and 5, a preferred system is disclosed for controlling magnetic tape apparatus to execute a cleaning cycle automatically when a cleaning cassette 10 is inserted in the apparatus. For this purpose, a cleaning cassette 10 (FIG. 1) is provided with a recess 40 in the housing 14 which serves as a code element representing the cleaning function of the cassette 10, and distinguishing this type of cassette from standard cassettes in which the recess 40 is capped or covered. Means are also provided, herein shown as a switch actuator 46, in the magnetic tape apparatus adapted to receive this cassette 10, for detecting the code element on a cassette 10 received in the apparatus. The switch actuator 46 is adapted to penetrate the recess 40, closing the contacts 48 of a switch 50 included in the apparatus and connected to a controller 52 operable to direct the magnetic tape apparatus through a cleaning cycle responsive to detecting a code element on a cassette received in the apparatus.

The steps involved in cleaning the driving, play-back and recording components of a magnetic tape apparatus using a cassette 10 of cleaning tape having a code element on the cassette, involve:

(1) inserting the cleaning cassette 10 in the apparatus;
(2) detecting the code element 40 on the cassette 10;
(3) initiating a cleaning cycle responsive to the detection of the code element 40; and
(4) ejecting the cassette 10 at the completion of the cleaning cycle.

It is important to rewind the cleaning tape before starting the cleaning cycle. If the cleaning tape is not first rewound, it may be close to the end of the tape when the cycle is begun, and that would prevent supply of sufficient cleaning tape and cleaning liquid to the machine components to clean them before the end of the tape is reached which terminates the transfer of the cleaning liquid to the apparatus. Accordingly, it is desired that the cleaning cycle initiated automatically when the cassette 10 is inserted also involves:

(a) rewinding the cleaning tape in the cassette 10 completely on a take-off reel 12.

To carry out a fully cleaning function, the cleaning tape should be driven at normal playing speed in the apparatus during the cleaning cycle. Since the automatic stop control of the magnetic tape apparatus may not operate perfectly with a clean-cassette, it is also desired to stop the tape automatically before the end of the tape is reached. This may be accomplished by timing the transfer of the tape, or by monitoring tape movement. Therefore, it is also desired to include the step:

(b) driving the cleaning tape at a normal playing speed in the apparatus for a predetermined period less than the full playing period for the tape on the take-off reel.

Finally, to prepare for subsequent cleaning operations, it is important to:

(c) rewind the cleaning tape completely on the take-off reel.

For carrying out the cleaning cycle involving steps 1–4 and a–c, a microprocessor based control system 52 is preferably provided, having a program stored in memory 54 and controlling the apparatus 56 to carry out these functions, as indicated in the chart of functions included in FIG. 5.

What is claimed is:

1. A cleaning cassette including a cassette housing, a pair of reel hubs mounted in said housing, a tape connected to be driven between said reel hubs, a source of cleaning liquid including roller means rotatably supported in said housing to contact the tape and having a core of absorbent material, and means for applying liquid from said source to wet a surface of said tape intermittently including absorbent material exposed only on a portion of the surface of said roller to contact the tape and apply liquid received from the core to intermittent portions of the tape as the tape is continuously driven from one of the reel hubs to the other, said cassette housing having an opening permitting the introduction of cleaning liquid to said core.

2. A cleaning cassette according to claim 1, including a device for speading through the core, cleaning liquid which has been introduced through said opening in said housing.

3. A cleaning cassette comprising a pair of reel hubs, a tape connected for movement between said reel hubs, a source of cleaning liquid, and means for applying said liquid from said source to wet a surface of said tape intermittently as said tape is moved between said reel hubs, said means including a roller mounted in said cassette and having absorbent material exposed only on a limited portion of its surface and said limited portion serving as a liquid applicator contacting the tape to apply liquid to intermittent portions of the tape as the tape moves between said reel hubs, said cassette permitting the introduction of cleaning liquid to said source.

4. A cleaning cassette comprising a pair of reel hubs, a tape connected for movement between said cleaning reel hubs, a source of cleaning liquid within said cassette, a liquid applicator mounted in said cassette and receiving cleaning liquid from said source, and means including a rotational member operated by movement of the tape for moving said tape and said liquid applicator into intermittent contact to wet a surface of said tape responsive to movement of the tape between said reel hubs during a cleaning operation to apply cleaning liquid to intermittent portions of the tape while the tape is continuously running.

5. A cleaning cassette according to claim 4 wherein said rotational member comprises a roller having absorbent material exposed on only a portion of its surface for contacting the tape.

6. A cleaning cassette according to claim 4 wherein said liquid applicator is movably mounted in said cassette and the tape is moved into contact with said liquid applicator responsive to the movement of the tape between said reel hubs during a cleaning operation.

7. A cleaning cassette according to claim 4 including a cassette housing, and wherein said means includes absorbent material serving as a liquid applicator and intermittently moved into contact with the tape.

* * * * *

UNITED STATES PATENT AND TRADEMARK OFFICE
CERTIFICATE OF CORRECTION

PATENT NO. : 4,635,156

DATED : January 6, 1987

INVENTOR(S) : d'Alayer de Costemore d'Arc

It is certified that error appears in the above-identified patent and that said Letters Patent is hereby corrected as shown below:

In claim 2, column 4, line 29, change "speading" to --spreading--.

Signed and Sealed this

Twenty-eighth Day of April, 1987

Attest:

DONALD J. QUIGG

*Attesting Officer*   *Commissioner of Patents and Trademarks*